United States Patent
Ostendarp

(12) 
(10) Patent No.: US 6,220,056 B1
(45) Date of Patent: Apr. 24, 2001

(54) DEVICE FOR HANDLING THIN PANES OF GLASS AND FRAGILE WORK PIECES

(75) Inventor: Heinrich Ostendarp, Mainz (DE)

(73) Assignee: Schott Glaswerke, Mainz (DE)

( * ) Notice: Subject to any disclaimer, the term of this patent is extended or adjusted under 35 U.S.C. 154(b) by 0 days.

(21) Appl. No.: 08/978,885

(22) Filed: Nov. 26, 1997

(30) Foreign Application Priority Data

Nov. 29, 1996 (DE) .............................. 196 49 488

(51) Int. Cl.$^7$ .................................................. C03B 33/03
(52) U.S. Cl. ........................... 65/175; 65/174; 65/182.2; 83/86; 406/88; 406/89; 414/676; 414/677
(58) Field of Search .................... 65/61, 97, 105, 65/174, 175, 182.2, 273, 348; 83/86; 406/88, 89; 414/676, 677

(56) References Cited

U.S. PATENT DOCUMENTS

| | | | |
|---|---|---|---|
| 2,584,851 | * 2/1952 | Dunipace ................... | 225/2 |
| 2,690,034 | * 9/1954 | Laverdisse ................. | 451/14 |
| 2,945,600 | * 7/1960 | Thumim .................... | 414/676 |
| 3,253,756 | * 5/1966 | Haley et al. ............... | 225/2 |
| 3,291,590 | * 12/1966 | McMaster ................... | 65/182.2 |
| 3,355,275 | * 11/1967 | Sensi et al. .............. | 65/99.2 |
| 3,365,286 | * 1/1968 | Nedelec ................... | 65/114 |
| 3,607,198 | * 9/1971 | Meunler et al. ............ | 65/182.2 |
| 3,615,315 | * 10/1971 | Michalik et al. ........... | 65/25.3 |
| 3,630,706 | * 12/1971 | Oelke et al. . | |
| 3,645,581 | * 2/1972 | Lasch, Jr. et al. ......... | 406/31 |
| 3,685,632 | 8/1972 | Brady ..................... | 406/88 |
| 3,724,045 | * 4/1973 | Dryon ..................... | 29/90.01 |
| 3,838,803 | * 10/1974 | Berry ..................... | 225/98 |
| 3,945,505 | 3/1976 | Frisbie et al. ............ | 414/331 |
| 3,975,057 | * 8/1976 | Hurd ...................... | 406/84 |
| 4,230,474 | * 10/1980 | Roth et al. ............... | 65/114 |
| 4,326,872 | * 4/1982 | Miltenberger et al. ....... | 65/112 |
| 4,500,229 | * 2/1985 | Cole et al. ............... | 406/88 |
| 4,527,346 | * 7/1985 | Schwartzott ............... | 38/144 |
| 4,828,900 | * 5/1989 | Mouly ..................... | 428/192 |
| 5,051,058 | * 9/1991 | Roth ...................... | 414/789.1 |
| 5,066,321 | * 11/1991 | Kramer et al. ............. | 65/182.2 |
| 5,156,664 | * 10/1992 | Maltby, Jr. et al. ........ | 65/182.2 |
| 5,211,092 | * 5/1993 | Blasi ..................... | 83/98 |
| 5,290,999 | * 3/1994 | Kuster et al. ............. | 219/388 |
| 5,570,977 | * 11/1996 | Sllimkowski et al. ........ | 406/88 |
| 5,634,636 | * 6/1997 | Jackson et al. ............ | 271/225 |
| 5,639,289 | * 6/1997 | Fluckiger ................. | 65/166 |
| 5,669,953 | * 9/1997 | Schnabel, Jr. et al. ...... | 65/182.2 |

FOREIGN PATENT DOCUMENTS 1 956 273  5/1971 (DE) .
336332  * 4/1989 (EP) .

* cited by examiner

Primary Examiner—Sean Vincent
(74) Attorney, Agent, or Firm—McDonnell Boehnen Hulbert & Berghoff

(57) ABSTRACT

For handling thin panes of glass or similar work pieces and products in conveyance systems, machining installations, and the like, by means of pneumatic forces, a device is proposed that is characterized by two plates (1, 2) with flat surfaces on at least one side, arranged parallel to each other at a distance (D) sufficient to hold the pane of glass (3) without contact, where the plates (1, 2) have a multitude of gas passages (4), and all the gas passages (4) of a plate (1, 2) can each be connected to a gas delivery device through one or more ducts, etc. to generate an excess pressure or a vacuum, and where at least some of the gas passages (4) are arranged in pairs opposite each other.

21 Claims, 2 Drawing Sheets

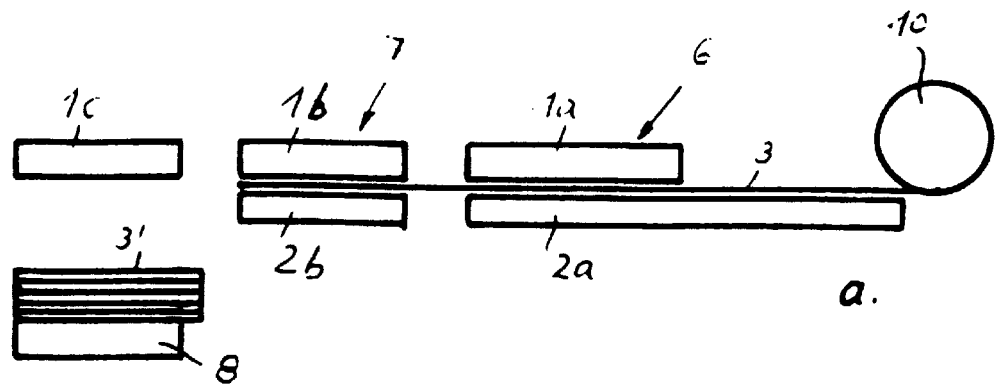
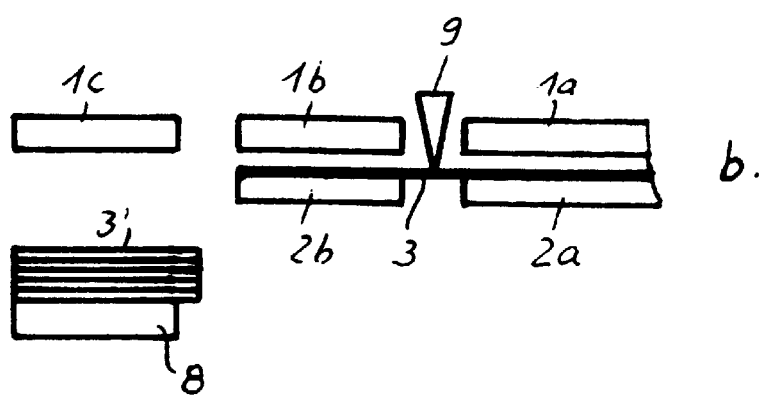
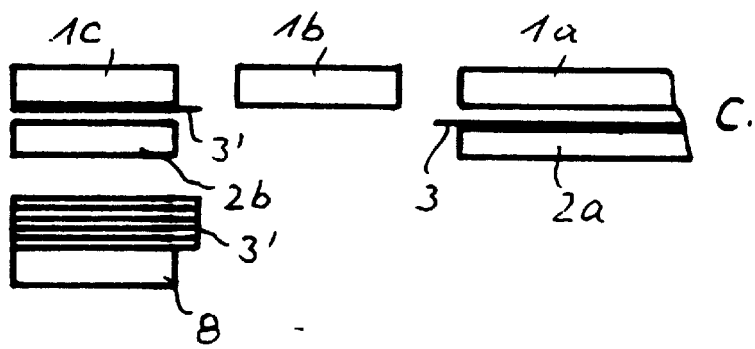
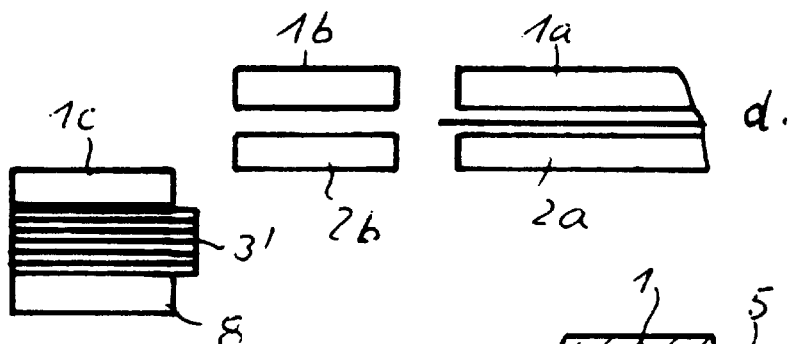
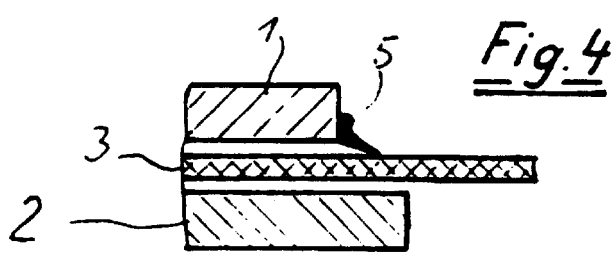
Fig. 5
Fig. 4

DEVICE FOR HANDLING THIN PANES OF GLASS AND FRAGILE WORK PIECES

This invention claims priority to German patent application Serial No. 196 49 488.5-22 DE, filed Nov. 29, 1996.

BACKGROUND OF THE INVENTION

1. Field of the Invention

The invention concerns a device for handling thin panes of glass or similar work pieces and products in conveyor systems, machining installations, and the like by pneumatic forces.

2. Summary of the Related Art

Thin plate glass is used on a large scale to produce displays, where scratches, inclusions, deposits, etc. larger than approximately 10 μm are seen as defects because they cause intolerable local distortion of the image in the finished display. Therefore, extensive control measures must be provided to detect and reject products that cannot be used.

Since there are also high demands regarding the flatness and parallelism of the plate glass used for window displays, the manufacturing process usually includes a surface polishing step. This makes it possible to eliminate many defects but it makes production considerably more expensive. There have therefore been great attempts to eliminate the polishing operation.

In recent plate glass manufacturing processes, the demands for flatness and parallelism of the glass surfaces can be maintained to a better extent on drawn or floated raw glass, so that polishing can be eliminated because of the cost advantages. However, this also eliminates the possibility of eliminating defects. On the other hand, plate glass in the thickness range of 30 to 300 μm for small display formats cannot currently be polished or it can be polished only at a high cost. Current projections indicate that formats up to 650×1000 mm with a plate glass thickness of 50 μm can be expected. In addition, the specifications with regard to the size of defects and the number of defects per unit of area have become increasingly more strict with the newer display grades of glass, e.g., field emission display (FED), plasma display panel (PDP), plasma addressed liquid crystal (PALC), thin film transistor (TFT) or super twisted nemetic (STN), so that glass manufacturers are forced to comply with stricter requirements to be able to offer a technically and economically acceptable product.

An indispensable manufacturing step is formatting the raw glass, which is manufactured in large plates or as a wide strip for economic reasons. Formatting therefore includes cutting to the desired display size, including processing of edges and comers, which may optionally be followed by a final cleaning.

A device for conveying glass in the form of a plate or a strip is already known from German Patent DE 1,756,070 B2, where the glass rests on a cushion of gas at a distance from a lower structure and can be conveyed horizontally relative to the lower structure without coming in contact with it. The lower structure is provided with slots side by side for the passage of the gas, although the slots are designed alternately as gas discharge and exhaust slots and are connected to appropriate pressure and vacuum sources. This generates an alternating field of mutually opposed forces which a thin pane of glass cannot withstand. Furthermore, only one of the two glass surfaces, at best, can be protected from soiling.

Furthermore, European Patent EP 336,332 B1 discloses a device for gripping, stacking and unstacking plate glass as well as conveying it, where vacuum grippers, which are known from another technology, are used. However, suction grippers cannot be used with glass below a certain minimum thickness because thin plate glass would sag in the area of the vacuum grippers or could even break in the worst case. Furthermore, vacuum grippers are not suitable for holding very thin plate glass for machining such as cutting, grinding and/or polishing because they result in uneven gripping, which cannot be maintained uniformly in the machining area. Moreover, the vacuum grippers do not prevent soiling of the glass surfaces in conveyance and machining.

SUMMARY OF THE INVENTION

The invention provides a device for handling thin plate glass in machining facilities, especially in cutting installations, that will make it possible to secure and convey both the existing raw glass formats as well as the finished formats in such a way that the surfaces are not damaged, deposits of dirt particles, cutting splinters, etc. are prevented and the possibility of fracture of the glass is ruled out. It must be pointed out that extremely gentle handling of the glass is demanded by the omission of polishing for technical or economic reasons, the trend toward larger and larger display formats and the fact that specifications regarding the size and frequency of defects.

To achieve this goal, a device of the type defined initially is proposed; it is characterized by at least two plates with flat surfaces on at least one side arranged parallel to each other at a distance sufficient for accommodating the pane of glass without contact, where the plates have numerous gas passages and all the gas passages in a plate can each be connected through one or more channels, etc, to a gas delivery device for generating an excess pressure or a reduced pressure. Preferably at least some of the gas passages are arranged opposite each other in pairs.

With this device, excess pressure can act on both plates in a first mode of operation, so that the pane of glass is held between the plates without coming in contact with them, or excess pressure may act on one plate while a reduced pressure acts on the other plate in a second mode of operation, so the pane of glass is pressed against one plate and held there. In the first mode of operation, a stream of gas emitted at both sides of the pane of glass held between the plates, preferably equally strong on both sides, is maintained to ensure that any dust, etc. that might be present is removed toward the outside and nothing can penetrate from the outside. At the same time, the pane of glass is not allowed to come in contact with either the top or bottom plate and therefore can be conveyed horizontally between the plates without any risk of scratching the glass surface. The gas stream produced is preferably emitted from pairs of opposite orifices.

The known self-regulating effect can be utilized; this comes about due to the fact that a vertical displacement of the pane of glass, i.e., an approach to one of the plates, leads to an increase in the cross section of flow between the pane of glass and the other plate, a decrease in pneumatic pressure with no change in gas throughput on this side and the development of forces that counteract the vertical displacement. The gravity acting perpendicularly on the pane of glass in one direction can easily be compensated through the control technology by having a marginally higher excess pressure act on the bottom plate if the pane of glass must be positioned accurately exactly in the middle between the plates.

The second mode of operation, where the pane of glass is held against one of the plates, serves either to work on the glass while the plate is stationary or to displace the pane of glass together with the plate into another position, e.g., to convey it from the working position to a storage position or stacking position.

As long as the pane of glass is between the two plates, measures are taken on the excess pressure side to ensure, as before, that this glass surface cannot become soiled. On the vacuum side, the pane of glass is in contact with the plate, so that no contaminants can enter there if the surface of the plate is flat and smooth enough or if a suitable seal is provided at the edge between the plate and the pane of glass.

The arrangement of paired opposing gas passages ensures that in the first mode of operation, approximately the same pneumatic forces act everywhere on both sides of the glass surface, thus preventing the thin pane of glass from bulging out of the plane. In addition, a certain smoothing effect on the thin pane of glass can be achieved in this way.

In the second mode of operation, a smoothing effect that corresponds to the smoothing of paper by means of a hand movement can also be achieved when an excess pressure or a vacuum acts on the gas passages progressively by areas from the center of the plates toward the outside.

Thus, in a first aspect is provided a device for handling thin panes of glass or similar work pieces and products in conveyor systems, machining installations, and the like, by means of pneumatic forces, characterized by at least two plates with flat surfaces on at least one side, arranged parallel to each other at a distance (D) sufficient to hold the pane of glass without contact, where the plates each have a multitude of gas passages, and all the gas passages in a plate are each connected to a gas delivery system through one or more ducts, to produce between the plates an excess pressure in one embodiment, or a vacuum in another embodiment, In a preferred embodiment, at least a portion of the gas passages are arranged in pairs opposite each other. More preferably, the pairs of opposing gas passages each have essentially the same cross section of passage and the same flow resistance. Also preferred are plates wherein the surfaces of the opposing surfaces of the plates have essentially the same roughness, most preferably about 10 $\mu$m, and have paired identical surface profiles or textures.

In another preferred embodiment, the distance (D) between the plates can be adjusted to the thickness (d) of the pane of glass to be handled. In preferred embodiments, the plates are arranged essentially horizontal and at least one of the plates can be moved vertically. In additionally preferred embodiments, at least one of the plates can be moved horizontally.

In additional embodiments, at least one of the plates has a gasket running around the edges of the plate that prevents dust, glass shards, and other foreign bodies from penetrating between the plates and the pane of glass in embodiments wherein the glass plate is in contact with one of the plates and a vacuum is applied to the plate.

Also provided in this embodiment is a device that controls the amount of the applied vacuum or applied excess pressure. In a preferred embodiment, said device permits the applied vacuum or excess pressure to act on partial areas of the surfaces of the plates independently of each other. Also provided in this embodiment is a device that moves the pane of glass in a horizontal direction between the plates, wherein the pane of glass is held without contact between the plates by means of excess pressure on both sides. Also provided are means for holding the horizontal position of the pane of glass in one position, i.e. stationary between the two plates of the device of the invention.

In certain embodiments of the invention, the effective area of the plates, that is, the portion of the plate comprising the gas passages that is effective for applying a vacuum or excess pressure on the plate, is smaller than the area of the pane of glass to be handled. In these embodiments, the invention also preferably provides devices to machine the pane of glass outside the effective area of the plates.

In other embodiments, the effective area of the plates is equal to or larger than the area of the pane of glass to be handled. In these embodiments, the plates are provided with recesses and devices are additionally provided machine the pane of glass along the recesses in the plate.

In yet other embodiments, the devices of the invention are provided wherein one of the plates comprises two or more sectional areas that are arranged with a continuous interspace between them. In these embodiments, devices are provided to machine the pane of glass between the partial areas along the continuous interspace.

In another aspect of the invention is provided a device for handling thin panes of glass, comprising a first pair of plates arranged horizontally and forming a feed device for the pane of glass, and a second pair of plates that form a machining station for the pane of glass, where at least one of the plates can be moved vertically and/or horizontally. In this aspect, a preferred embodiment comprises an additional plate, more preferably a top plate, that conveys the machined and finished glass section out of the machining station. In this embodiment, the additional plate can be moved horizontally and/or vertically. In additional embodiment of this aspect of the invention is provided a means for stacking the finished glass plates wherein the additional top plate and the stacking means are arranged at a position downstream from the machining station. In an additional preferred embodiment, the stacking means can be moved vertically and arranged so that the depositing level can be advanced toward the section of glass to be deposited without having to move the top plate vertically.

In another aspect of the invention is provided a device for non-contact conveyance of a thin pane of glass by a means for conveying the glass that grips the edges of the pane of glass. In this embodiment, the device comprises a plurality of pairs of plates arranged in the direction of conveyance having a distance between each pair of plates that is sufficient to hold the pane of glass therebetween without contacting the plates. In this embodiment, each plate comprises at least one flat surface, a plurality of gas passages and a means for delivering gas to both surfaces of each plate of each pair for producing excess pressure between the plates. Additionally, in this aspect is provided spaces between the plates for exhausting the gas producing the excess pressure between the plates.

In each embodiment and aspect of the invention disclosed herein is additionally and advantageously provided a means for heating the gas and/or the panes of glass in embodiments wherein excess pressure is applied between the plates, whereby the thin pane of glass is subjected to a heat treatment or tempering thereby.

Specific preferred embodiments of the present invention will become evident from the following more detailed description of certain preferred embodiments and the claims.

BRIEF DESCRIPTION OF THE DRAWINGS

FIG. 4 shows an enlarged diagram of a section through the edge area of a device according to this invention.

FIG. 5 shows a diagram of a sequence of working steps using a device according to this invention.

DETAILED DESCRIPTION OF THE INVENTION

Figure 1:
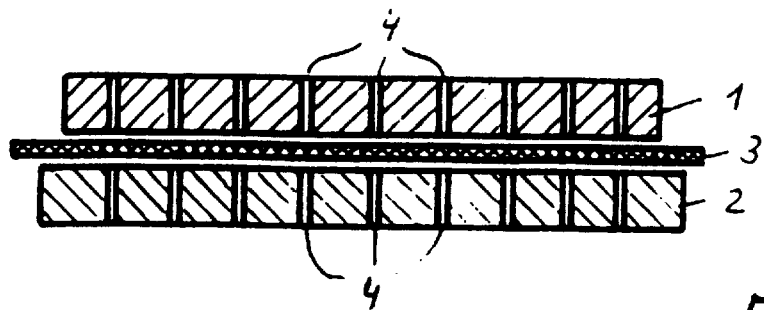
FIG. 1 shows a schematic diagram of a vertical section through a device according to this invention.

The device, which is shown schematically in FIG. 1, includes a top plate 1 and a bottom plate 2, enclosing a thin pane of glass 3 between them without contact. This is achieved when the paired opposing gas passages 4 are connected to a gas delivery device for generating an excess pressure on both plates 1, 2. The equal streams of gas coming out of plates 1, 2 in a paired arrangement above and below the thin pane of glass 3 keep the thin pane of glass 3 more or less suspended, where a vertical displacement of the pane of glass immediately results in forces directed in the opposite direction, as mentioned above, so the non-contact position of the pane of glass 3 between the plates 1, 2 is maintained in a self-regulating manner.

In this position, the pane of glass 3 can be held and secured horizontally or conveyed in a non-contact manner between the plates 1, 2 while the conventional conveyor devices (not shown) can grip the pane of glass 3 at the projecting edges.

Figure 2:
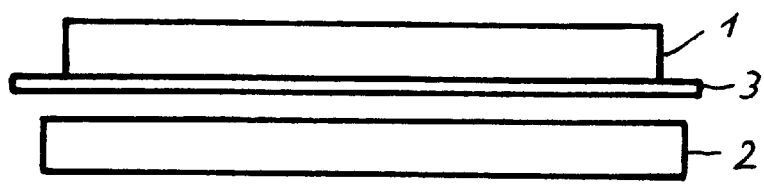
FIG. 2 shows a side view of the device according to the invention.
Figure 3:
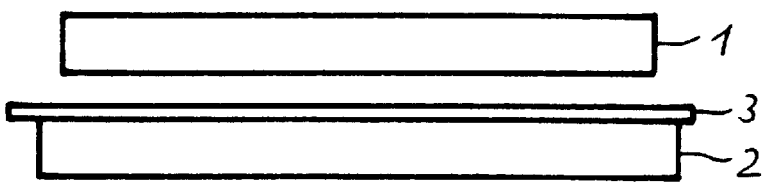
FIG. 3 also shows a side view of the device according to the invention.

FIG. 2 shows in diagram form the position of the pane of glass 3 when a vacuum is acting on the top plate 1 and an excess pressure is acting on the bottom plate 2. FIG. 3 shows the position of the pane of glass 3 when the pressure effects are reversed. In the position according to FIG. 2, the pane of glass 3 can be worked in the area outside the top plate, with the bottom plate serving as a support to absorb the forces of working, or it may be moved vertically and horizontally together with the top plate to displace it from the position illustrated here to the next position as part of an automated manufacturing process. In the same way, the pane of glass can also be worked in the position according to FIG. 3 and conveyed together with the bottom plate 2. In all cases, the stream of gas coming out of the plate 1, 2 at a distance from the pane of glass ensures that the exposed glass surface cannot become contaminated by dust or any particles generated by machining operations. The glass surface in contact with a plate is protected anyway.

In the transition from the use of pressure according to FIG. 1 and that according to FIG. 2 or 3, a stream of gas directed inward from the outside occurs briefly and could entrain particles of dirt. To prevent this, plate 1 according to FIG. 4 is provided with a suitable gasket 5 at the edges, with this gasket being supported on the thin pane of glass with a soft elastic tongue, thus preventing the penetration of foreign particles and helping to maintain the vacuum. Such a gasket can also be provided on both plates 1, 2 if means are taken to ensure that the thin pane of glass is not thereby subjected to any bending forces.

FIG. 5 shows a possible sequence of steps in working thin glass, where the device according to this invention can be used to advantage. The entire device includes a total of three top plates and two bottom plates (1a–1c, 2a, 2b) that are arranged one after the other in the working direction and define a straight horizontal working path for the pane of glass 3 or for glass sections 3' separated from the former. In the case illustrated here, a roll of raw glass 10 is assumed, whose rolled end is conveyed into a machining station by a conveyor device 6. The feed station 6 includes a top plate 1a and a bottom plate 2a, both of which are equipped with pairs of opposing gas passages through which an excess pressure or a reduced pressure can be applied to the glass, as described above. The bottom plate 2a is much longer than the top plate 1a, with either no gas passages being provided in the part that projects at the right or the gas passages there can be under a different pressure. Plates 1a and 2a may be arranged in a stationary manner, because they have no function except for holding the glass in suspension without contact as it is conveyed.

Plates 1b and 2b of the machining station 7 are essentially equal in size and are provided with gas passages in the same manner, where minor deviations in the planar extent, such as those in FIGS. 1 through 4, are not illustrated here. However, it should be pointed out that at least plate 1b of machining station 7 is generally slightly narrower than the glass strip to be machined, so that edge cutting on both sides is readily possible.

In FIG. 5a the pane of glass 3 or the raw glass strip is drawn off from raw glass roll 10 from right to left by means of conveyance devices (not shown here) that act on the edges and keep the glass "in suspension" so that a front cut edge is in the area of the left end of the machining station 7. Plate 1c is in its resting position above the stacking device 8 and the glass sections 3' that have already been finished. In FIG. 5b an excess pressure acts on the top plates 1a and 1b and a vacuum acts on the bottom plates 2a and 2b. The pane of glass 3 is in contact with the bottom plates 2a, 2b and is thus secured in the machining position. It can then be machined by a cutting device 9, i.e., a section 3' of glass can be cut from the raw glass strip. Any suitable cutting devices may be used. If the pane of glass is not completely severed, but instead is merely weakened, it is sufficient, especially when working with thin glass, to merely change the pressure acting in feed device 6 or in machining station 7 to achieve the break in the remaining cross section. However, known glass cutting devices can of course also be used.

It should also be pointed out here that the raw glass strip projects beyond the longitudinal edges of machining station 7 and can be machined in a similar way. Machining of the edges and corners may optionally also be performed here by grinding here and along the cutting edges running across the direction of the strip.

FIG. 5c shows how the glass section 3' is brought by the horizontally movable plate 2b into a position opposite the top plate 1c and held in place by it by suction. After returning plate 2b to its starting position, plate 1c can be moved vertically downward according to FIG. 5b to deposit glass section 3' on stacking device 8. At the same time, the raw glass strip can be raised into the suspended position in feed device 6 and then conveyed without contact to machining station 7. This makes it possible to implement an economical sequence of operations.

The working steps illustrated in FIG. 5 can of course also be carried out with more movable plates and with plates that are moved in other ways. In particular, the depositing movement may be across the direction of conveyance of the raw glass strip. Two or more machining stations may also be set up if several separate working steps are to be carried out and thus a more economical utilization of the individual stations can be achieved.

The invention can also be utilized to advantage when thin glass in individual sections or as a strip must be conveyed over a long distance. With several pairs of plates arranged with a space between them in the direction of conveyance according to FIG. 1, with an excess pressure acting on both sides of all pairs of plates, it is possible to achieve a non-contact conveyance, but of course conveyor belts acting on the sides or some similar mechanisms must also be provided.

Finally, it is also possible to heat the glass and/or the panes of glass supplied in the excess pressure operation so that the thin panes of glass between the plates are subjected to a heat treatment (tempering).

In all cases, the advantages according to this invention can be utilized: optional non-contact and non-bending conveyance and holding, securing the pane of glass on a plate and keeping the glass surfaces clean with a permanent stream of gas or tight contact with a plate during the entire handling operation.

The present invention is not to be limited in scope by the exemplified embodiments, which are intended as illustrations of individual aspects of the invention. Indeed, various modifications of the invention in addition to those shown and described herein will become apparent to those skilled in the art from the foregoing description and accompanying drawings. Such modifications are intended to fall within the scope of the appended claims.

All publications cited herein are incorporated by reference in their entirety.

I claim:

1. A device for handling a thin pane of glass or fragile workpieces and products, comprising at least two plates, each plate having a planar surface, the plates being arranged in a substantially horizontal manner and so that the planar surfaces are parallel to and facing each other at a distance from each other sufficient to position a pane of glass therebetween without contacting the planar surfaces, each plate further having a multiplicity of gas passages extending therethough, each gas passage being connected to a gas delivery and removal system via one or more ducts through which a gas stream is delivered to or removed from the plates, the gas delivery and removal system having a first and a second mode of operation, in the first mode of operation, gas is delivered to the gas passages of both plates so that a pane of glass can be kept apart from the planar surfaces in order to convey the pane of glass parallel to the planar surfaces without contacting them and, in the second mode of operation, gas is removed through the gas passages of one of the plates so that a pane of glass can be held in contact with the planar surface of the same plate in order to enable work to be done on the pane of glass.

2. The device according to claim 1, further comprising a means for applying gas uniformly on both planar surfaces.

3. The device according to claim 1, wherein some of the gas passages in the plates are arranged in pairs opposite each other.

4. The device according to claim 3, wherein the pairs of opposing gas passages have a cross sectional area of passage and a flow resistance that are substantially the same.

5. The device according to claim 1, wherein the distance between the plates can be adjusted to accommodate the thickness of the pane of glass to be handled.

6. The device according to claim 1, wherein at least one of the plates can be moved vertically or horizontally.

7. The device according to claim 1, wherein the planar surfaces of the plates facing each other have a roughness and a surface profile that are substantially the same, the roughness being approximately 10 $\mu$m.

8. The device according to claim 1, wherein at least one of the plates further comprises a gasket extending about each edge to prevent dust or dirt from penetrating between the pane of glass and the planar surface of that plate when gas is removed therefrom.

9. The device according to claim 1, further comprising means for controlling the gas stream being delivered to or removed from each plate so that gas can act on partial areas of the plates independently of each other.

10. The device according to claim 1, further comprising conveying means by which a pane of glass can be moved parallel to the planar surfaces of the plates or can be held in a stationary position between the planar surfaces of the plates.

11. The device according to claim 1, wherein each planar surface has an effective area that is smaller than the area of the glass pane to be handled and wherein the device further comprises means for machining on the pane of glass outside the effective area of the planar surfaces.

12. The device according to claim 1, wherein each planar surface has an effective area that is equal to or larger than the area of the pane of glass to be handled, the plates further comprising recesses and means for machining the pane of the glass along the recesses in each plate.

13. The device according to claim 1, wherein one of the plates comprises two or more partial areas that are arranged with a continuous interspace between them, and the device further comprises means for machining the pane of glass between the partial areas of the plate along the continuous interspace.

14. The device according to claim 1, further comprising a first pair of plates arranged horizontally to form a feed device for the pane of glass and a second pair of plates that forms a machining station for the pane of glass, whereby at least one of the plates of the second pair can be moved vertically or horizontally.

15. The device according to claim 14, further comprising an additional plate for conveying the machined pane of glass out of the machining station.

16. The device according to claim 15, wherein the additional plate can be moved horizontally or vertically.

17. The device according to claim 16, further comprising a stacking device, the additional plate and the stacking device being arranged downstream from the machining station.

18. The device according to claim 17, wherein the stacking device can be moved vertically so that a depositing level can be advanced toward the pane of the glass to be stacked without having to move the additional plate vertically.

19. The device according to claim 1, further comprising means for heat treating a pane of glass when the pane of glass is kept between the plates apart from their planar surfaces.

20. A device for the conveyance of thin panes of glass by a conveyer that grips the opposing edges of the panes of glass, the device comprising a plurality of pairs of plates arranged in the direction of conveyance, the plates having planar surfaces that are arranged in a substantially horizontal manner, and parallel to and facing each other at a distance that is sufficient to position a pane of glass therebetween without contacting the planar surfaces, the plates further having a multiplicity of gas passages extending therethrough, each gas passage being connected to a gas delivery and removal system via one or more ducts through which a gas stream can be delivered to the pairs of plates to keep the panes of glass apart from the planar surfaces during the conveyance as well as through which a gas stream can be removed to hold the pane of glass in contact with the planar surface of one of the pair of plates in order to enable work to be done on the pane of glass.

21. The device according to claim 20, further comprising spaces provided between the pairs of plates in the direction of conveyance for exhausting the gas.

* * * * *